Patented Mar. 21, 1933

1,902,144

UNITED STATES PATENT OFFICE

STAPLETON D. GOOCH, OF LAKE WALES, AND FRIEDRICH P. KERSCHBAUM, OF WINTER HAVEN, FLORIDA, ASSIGNORS TO CORONET PHOSPHATE COMPANY, OF NEW YORK, N. Y., A CORPORATION OF NEW YORK

PROCESS FOR PRODUCING RED PHOSPHORUS

No Drawing. Application filed November 29, 1930, Serial No. 499,124, and in Germany December 2, 1929.

This invention relates to the production of red phosphorus, and more particularly to a method of producing red phosphorus from gases containing phosphorous vapor.

Heretofore in the production of phosphorus by condensation of phosphorous vapors from the effluent gases of an electric furnace, the product obtained consisted of a mixture of red and yellow phosphorus in which the yellow phosphorus was predominant. This material is rather dangerous to handle inasmuch as it is toxic and burns spontaneously in air.

It has been proposed in the past to transform the yellow phosphorus to red phosphorus. These treatments, however, were rather complicated and involved considerable additional cost. Because of this additional working in the past the red variety of the phosphorus was about three times as expensive as the yellow variety.

It is an object of the present invention to directly produce red phosphorus by volatilizing phosphorus from its compounds.

Another object is to directly produce red phosphorus from the gases produced by pyrolytic reduction of phosphatic material.

Yet another object is to provide a method of producing red phosphorus by a continuous process in which phosphatic raw material is volatilized to form phosphorous vapor and in which the phosphorus is transformed, while in the vapor phase, to the red variety.

Yet another object is to provide a process of producing new mixtures of phosphoric acid and other materials which are specially suitable for fertilizer use.

With these and other equally important objects in view the invention, considered broadly, resides in the concept of subjecting the phosphorous gases, produced either by electric or blast furnace pyrolytic reduction of phosphatic material, to the action of catalytic substances which effect the transformation of the phosphorus from the yellow to the red form. By this method it has been found possible to convert all or substantially all of the phosphorus, before condensation, directly to the form of red phosphorus.

In carrying out the process phosphatic containing material, as tricalcium phosphate, may be mixed with a suitable reducing agent, such as carbon or silica or a mixture of the two, and heated to decomposition temperatures in an electric furnace. Under the thermal conditions of reduction the phosphorus contained in the raw material is driven off in the form of phosphorous vapor.

At any suitable point in the apparatus through which the phosphorous vapor flows catalysts may be introduced. Those catalysts are chosen which have the property of assisting in the transformation of the yellow phosphorus to the red form. Examples of such catalysts are iodine, bromine, nitrogen oxides and so forth. In operating the process only very small amounts of the catalyst may be employed, for example about one-tenth of one per cent of the catalyst, based upon the amount of phosphorus condensed, need be employed.

It will be observed that due to the fact that the catalyst is introduced into the stream of evolved gases, the transformation takes place in the vapor phase. After this transformation the formed red phosphorus may then be condensed in the usual or any desired manner. This material, unlike the yellow variety, does not form waxy or sticky deposits. The red phosphorus does not glow in air, is not poisonous and does not ignite spontaneously. The deposited or precipitated phosphorus is substantially free from the yellow variety or contains only very small quantities of the latter. The type of phosphorus obtained by this process can, therefore, be immediately and safely handled and transported.

In many instances, as where the phosphorus which is obtained is to be transformed into phosphoric acid for use in the fertilizer industry, it is advantageous to increase the amount of the catalyst employed. Certain of these materials, such for example as iodine, may be utilized in rather large amounts and the conditions of precipitation or condensation so controlled that it appears in quantities in the recovered phosphorus. Upon subsequent oxidation to phosphoric acid the iodine content vaporizes and is condensed together with the phosphoric acid. When such phosphoric acid is transformed in phosphoric acid salts, as for example by treating with ammonium to form ammonium phosphate, the final product contains iodine compounds of ammonia as well as the ammonium phosphate which is a beneficial ingredient in fertilizers.

It has been proposed heretofore to produce the red phosphorus from its allotrope by treating yellow phosphorus in a closed vessel and under pressure with different catalysts. In these processes, due to the high pressure employed, the phosphorus is maintained in the liquid phase and the transformation to the red form is made in the molten or liquid condition. In sharp contradistinction to these methods, the yellow phosphorus is transformed to the red variety in the vapor phase and preferably during the production of the phosphorus from the raw materials containing the substances.

Furthermore, it has heretofore been proposed to produce red phosphorus by heating a solution of yellow phosphorus in an organic solvent such as benzine, toluol or similar hydrocarbons, with the addition of catalytic substances. This type of process, like the other, involves the treatment of the phosphorus in the liquid phase and is quite uneconomical due to the utilization of expensive solvents.

It will now be seen that according to the present process it is possible to produce phosphorus in the red, non-poisonous and practically non-inflammable modification. In addition to this the process may be carried out very simply and concomitantly with the initial production of the phosphorus from its compounds. This effects a very marked simplification of the process and avoids the separate steps of treatment heretofore required. Therefore, while we have described a particular method of carrying out the process, it is to be understood that this is given merely by way of example of the many materials which may be utilized to effect the principles described herein. As an example, the preferred method described illustrates the broad principle of transforming the yellow phosphorus to its red allotrope while in vapor phase and/or during the initial production of phosphorous vapor by thermal decomposition of phosphorous containing materials.

We claim:

1. A process for the production of red phosphorus from hot gases containing phosphorus substantially entirely in vapor phase comprising adding to the gases from an extraneous source substances capable of transforming yellow phosphorus into the red modification.

2. A process for the production of red phosphorus heating phosphatic raw materials to temperatures sufficiently high to evolve phosphorus in vapor form adding to the gases an excess of a substance capable of transforming yellow phosphorus to the red variety, condensing the phosphorus and recovering a quantity of the said substance in the condensate.

3. A process of producing red phosphorus comprising volatilizing yellow phosphorus and then while maintaining the phosphorus in highly heated condition so as to insure the maintenance of the phosphorus in vapor phase contacting the phosphorus vapors with a catalyst capable of transforming the yellow phosphorus to the red variety.

4. A process of producing red phosphorus comprising highly heating yellow phosphorus to transform substantially all of the phosphorus into the form of vapor and then contacting the phosphorus while maintained substantially completely in vapor phase with a catalyst capable of transforming the yellow phosphorus to the red variety, and then condensing the red phosphorus.

5. A process of producing red phosphorus which comprises heating a phosphatic material to temperatures sufficiently high to volatilize yellow phosphorus, contacting the hot gases containing all the phosphorus in vapor form with a substance capable of transforming yellow to red phosphorus, condensing the phosphorus and recovering a mixture of the phosphorus and the said substance.

In testimony whereof I affix my signature.
FRIEDRICH P. KERSCHBAUM.
In testimony whereof I affix my signature.
STAPLETON D. GOOCH.